United States Patent
Slack et al.

(10) Patent No.: US 11,283,097 B2
(45) Date of Patent: Mar. 22, 2022

(54) SYSTEMS, METHODS, AND DEVICES FOR CATION-ASSOCIATING FUEL CELL COMPONENTS

(71) Applicant: Nikola Corporation, Phoenix, AZ (US)

(72) Inventors: John Slack, Phoenix, AZ (US); Andrew Baker, Phoenix, AZ (US)

(73) Assignee: Nikola Corporation, Phoenix, AZ (US)

(*) Notice: Subject to any disclaimer, the term of this patent is extended or adjusted under 35 U.S.C. 154(b) by 0 days.

(21) Appl. No.: 17/346,674

(22) Filed: Jun. 14, 2021

(65) Prior Publication Data
US 2022/0052366 A1   Feb. 17, 2022

Related U.S. Application Data (60) Provisional application No. 63/065,632, filed on Aug. 14, 2020.

(51) Int. Cl.
| | |
|---|---|
| *H01M 8/1027* | (2016.01) |
| *H01M 8/1053* | (2016.01) |
| *H01M 8/1004* | (2016.01) |
| *H01M 8/10*   | (2016.01) |

(52) U.S. Cl.
CPC ....... *H01M 8/1027* (2013.01); *H01M 8/1004* (2013.01); *H01M 8/1053* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 7,579,116 B2 | 8/2009 | Mance et al. | |
| 2004/0018410 A1* | 1/2004 | Dai | H01M 8/1023 429/413 |
| 2009/0325030 A1* | 12/2009 | Hamrock | H01M 8/1081 429/492 |
| 2019/0245233 A1 | 8/2019 | Pintauro et al. | |

FOREIGN PATENT DOCUMENTS

| | | |
|---|---|---|
| WO | 2018187864 | 10/2018 |
| WO | 2020231628 | 11/2020 |

OTHER PUBLICATIONS

International Searching Authority, International Search Report and Written Opinion dated Oct. 5, 2021 in Application No. PCT/US2021/037203.

* cited by examiner

*Primary Examiner* — Daniel S Gatewood
(74) *Attorney, Agent, or Firm* — Snell & Wilmer L.L.P.

(57) ABSTRACT

Improved membrane electrode assemblies, cation-associating components thereof, and methods of making and treating the same are provided. Membrane electrode assemblies may include an ionomer having a first pKa value, and a water-insoluble net polymer having a weakly-acidic functional group, wherein the weakly-acidic functional group has a second pKa value greater than the first pKa value.

8 Claims, 8 Drawing Sheets

SYSTEMS, METHODS, AND DEVICES FOR CATION-ASSOCIATING FUEL CELL COMPONENTS

CROSS-REFERENCE TO RELATED APPLICATIONS

This application claims priority to, and the benefit of, U.S. Provisional Patent Application No. 63/065,632 filed on Aug. 14, 2020 and entitled "Systems, Methods, and Devices for Cation-Associating Fuel Cell Components." The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The disclosure relates generally to systems, methods, and devices for fuel cell components, and more particularly, to systems, methods, and devices for non-protonic cation-associating fuel cell components.

BACKGROUND

Current state-of-the-art membrane-electrode assemblies (MEAS) used in fuel cells (such as proton exchange membrane fuel cells) experience degradation and voltage decay over time as a result of damage caused by contaminant cations and radicals. Contaminant cations can be introduced from sources external to the fuel cell (e.g., incoming water, road salts, etc.) or from the fuel cell components themselves (e.g., bipolar plates, catalyst layer, ionomer, etc.). These contaminant cations can concentrate in the cathode catalyst layer ionomer of each cell in a fuel cell stack over time, causing a measurable decrease in proton conductivity and oxygen permeability of this ionomer, and collectively decreasing cell performance and durability. Contaminant cations may also move in the plane of the MEA, due in part to water gradients. Conventional approaches to mitigating contaminant cations seek to reduce the amount of contaminant cations present in the MEA. However, these approaches increase system cost and complexity, and only mitigate external contaminant cation sources.

Contaminant cations, such as iron, additionally contribute to the formation of free radicals within the proton exchange membrane. Free radical attack on the proton exchange membrane is a significant contributor to MEA performance and durability, degradation and failure. Radical scavengers have been utilized in some fuel cells to mitigate the effects of contaminant cations, which are potential sources of free radicals. However, upon exposure to water vapor and heat within the fuel cell, conventional radical scavengers dissolve and migrate within the fuel cell, contributing to a decrease in proton conductivity of the cathode catalyst layer and leaving portions of the MEA susceptible to radical attack and ionomer failure.

In light of these and other shortcomings of current approaches, fuel cells having components that capture contaminant cations and/or immobilize cation radical scavengers are desirable.

SUMMARY

In various embodiments, a membrane electrode assembly (MEA) is provided herein. The membrane electrode assembly can comprise an ionomer comprising a first pKa value, and a water-insoluble net polymer comprising a weakly-acidic functional group, wherein the weakly-acidic functional group comprises a second pKa value greater than the first pKa value.

In various embodiments, the weakly-acidic functional group comprises at least one of a phosphorous-based weak acid, a nitrogen-based weak acid, or an oxygen-based weak acid. In various embodiments, the weakly-acidic functional group comprises at least one of phosphonic acid, acrylic acid, methacrylic acid, methyl methacrylic acid, maleic acid, hydrohalic acid, or imide acid. In various embodiments, the ionomer comprises perfluorinated sulfonic acid and the water-insoluble net polymer comprises fluoropolymeric phosphonic acid. In various embodiments, a cation-associating layer of the membrane electrode assembly comprises the ionomer and the water-insoluble net polymer.

In various embodiments, the cation-associating layer comprises at least one of a pure cation-associating layer, a blended cation-associating layer, a copolymer, or a terpolymer. In various embodiments, the cation-associating layer is disposed in at least a portion of a proton exchange membrane of the membrane electrode assembly.

In various embodiments, the membrane electrode assembly further comprises a radical scavenger configured to preferentially associate with the weakly-acidic functional group. In various embodiments, the radical scavenger comprises at least one of a lanthanide metal or a transition metal having more than one oxidation state. In various embodiments, the at least one of a lanthanide metal or a transition metal comprises cerium. In various embodiments, the at least one of a lanthanide metal or a transition metal comprises manganese.

In various embodiments, the cation-associating layer is disposed in at least a portion of a cathode catalyst layer of the membrane electrode assembly. In various embodiments, the cation-associating layer is disposed between a cathode catalyst layer of the membrane electrode assembly and a microporous layer of the membrane electrode assembly.

In various embodiments, a first portion of the cation-associating layer comprises the ionomer, a second portion of the cation-associating layer comprises the water-insoluble net polymer, and the first portion is greater than the second portion. In various embodiments, a distribution of the ionomer and the water-insoluble net polymer in the cation-associating layer is substantially even. In various embodiments, a distribution of the ionomer and the water-insoluble net polymer in the cation-associating layer comprises an in-plane gradient. In various embodiments, a distribution of the ionomer and the water-insoluble net polymer in the cation-associating layer comprises a through-plane gradient.

In various embodiments, a cation-associating layer of the membrane electrode assembly comprises the water-insoluble net polymer. In various embodiments, the cation-associating layer is disposed between a cathode catalyst layer of the membrane electrode assembly and a cathode microporous layer of the membrane electrode assembly. In various embodiments, the cation-associating layer is disposed in at least a portion of a microporous layer of the membrane electrode assembly. In various embodiments, the cation-associating layer is disposed in at least one of an anode-side gas diffusion layer of the membrane electrode assembly or a cathode-side gas diffusion layer of the membrane electrode assembly. In various embodiments, the weakly-acidic functional group preferentially associates with non-protonic cations.

In various embodiments, the weakly-acidic functional group is bound to a backbone of the water-insoluble net polymer. In various embodiments, the weakly-acidic functional group is bound to a side-chain of the water-insoluble net polymer.

In various embodiments, the membrane electrode assembly further comprises a first cation-associating layer comprising the ionomer and a first portion of the water-insoluble net polymer, and at least one second cation-associating layer comprising a second portion of the water-insoluble net polymer, wherein the first cation-associating layer is configured to immobilize radical scavengers, and the at least one second cation-associating layer is configured to sequester contaminant cations.

In various embodiments, a fuel cell membrane is provided herein. The fuel cell membrane can comprise a weak acid-terminated fluoropolymer, and at least one of an ionomer or a structural support polymer. In various embodiments, the weak acid-terminated fluoropolymer is copolymerized with the ionomer. In various embodiments, the weak acid-terminated fluoropolymer comprises fluoropolymeric phosphonic acid. In various embodiments, the fuel cell membrane further comprises at least one of a lanthanide metal or a transition metal. In various embodiments, the at least one of a lanthanide metal or a transition metal comprises at least one of cerium or manganese.

In various embodiments, a membrane electrode assembly is provided herein. The membrane electrode assembly can comprise a proton exchange membrane disposed between an anode catalyst layer and a cathode catalyst layer, and a cation-associating layer comprising a water-insoluble net polymer, wherein the water-insoluble net polymer comprises a weakly-acidic functional group, and wherein the weakly-acidic functional group is configured to preferentially associate with non-protonic cations.

In various embodiments, the weakly-acidic functional group comprises at least one of a phosphorous-based weak acid, a nitrogen-based weak acid, or an oxygen-based weak acid. In various embodiments, the weakly-acidic functional group comprises at least one of phosphonic acid, acrylic acid, methacrylic acid, methyl methacrylic acid, maleic acid, hydrohalic acid, or imide acid. In various embodiments, the membrane electrode assembly further comprises an ionomer, wherein the ionomer comprises perfluorinated sulfonic acid, and the water-insoluble net polymer comprises fluoropolymeric phosphonic acid.

In various embodiments, the cation-associating layer further comprises an ionomer. In various embodiments, the cation-associating layer comprises at least one of a pure cation-associating layer, a blended cation-associating layer, a copolymer, or a terpolymer. In various embodiments, the cation-associating layer is disposed in at least a portion of the proton exchange membrane. In various embodiments, the membrane electrode assembly further comprises a radical scavenger configured to preferentially associate with the weakly-acidic functional group. In various embodiments, the radical scavenger comprises at least one of a lanthanide metal or a transition metal having more than one oxidation state. In various embodiments, the at least one of a lanthanide metal or a transition metal comprises cerium. In various embodiments, the at least one of a lanthanide metal or a transition metal comprises manganese.

In various embodiments, the cation-associating layer is disposed in at least a portion of the cathode catalyst layer. In various embodiments, the cation-associating layer is disposed between the cathode catalyst layer and a microporous layer of the membrane electrode assembly. In various embodiments, a first portion of the cation-associating layer comprises the ionomer, a second portion of the cation-associating layer comprises the water-insoluble net polymer, and the first portion is greater than the second portion.

In various embodiments, a distribution of the ionomer and the water-insoluble net polymer in the cation-associating layer is substantially uniform. In various embodiments, a distribution of the ionomer and the water-insoluble net polymer in the cation-associating layer comprises an in-plane gradient. In various embodiments, a distribution of the ionomer and the water-insoluble net polymer in the cation-associating layer comprises a through-plane gradient.

In various embodiments, the cation-associating layer is disposed between the cathode catalyst layer and a cathode microporous layer of the membrane electrode assembly. In various embodiments, the cation-associating layer is disposed in at least a portion of a microporous layer of the membrane electrode assembly. In various embodiments, the cation-associating layer is disposed in at least one of an anode-side gas diffusion layer of the membrane electrode assembly or a cathode-side gas diffusion layer of the membrane electrode assembly. In various embodiments, the weakly-acidic functional group is bound to a backbone of the water-insoluble net polymer. In various embodiments, the weakly-acidic functional group is bound to a side-chain of the water-insoluble net polymer.

In various embodiments, a hydrogen fuel cell is provided herein. The hydrogen fuel cell can comprise a proton exchange membrane disposed between an anode catalyst layer and a cathode catalyst layer, and a cation-associating layer comprising a water-insoluble net polymer, wherein the water-insoluble net polymer comprises a weakly-acidic functional group, and wherein the weakly-acidic functional group is configured to preferentially associate with non-protonic cations.

In various embodiments, a method of making a proton exchange membrane is provided herein. The method of making a proton exchange membrane can comprise synthesizing a perfluorinated monomer comprising a weakly-acidic functional group, and co-polymerizing the perfluorinated monomer with a proton conducting ionomer to produce a cation-associating layer. In various embodiments, the method of making a proton exchange membrane further comprises contacting the cation-associating layer with a radical scavenger. In various embodiments, the radical scavenger comprises at least one of cerium or manganese. In various embodiments, the perfluorinated monomer comprises perfluorinated phosphonic acid and the proton conducting ionomer comprises at least one of tetrafluoroethylene or perfluorosulfonic acid.

In various embodiments, a method of making a membrane electrode assembly is provided herein. The method of making a membrane electrode assembly can comprise disposing a proton exchange membrane between an anode catalyst layer and a cathode catalyst layer, contacting a cation-associating layer with at least one of a lanthanide metal or a transition metal, wherein the cation-associating layer comprises a weak acid-terminated fluoropolymer, and disposing the cation-associating layer in at least a portion of the membrane electrode assembly. In various embodiments, the cation-associating layer is disposed in at least one of: at least a portion of the proton exchange membrane; at least a portion of the cathode catalyst layer; at least a portion of a cathode microporous layer of the membrane electrode assembly; between the cathode catalyst layer and the cathode microporous layer; at least a portion of an anode-side gas diffusion layer of the membrane electrode assembly; or at least a portion of a cathode-side gas diffusion layer of the membrane electrode assembly.

In various embodiments, a method of treating a hydrogen fuel cell is provided herein. The method of treating a hydrogen fuel cell can comprise contacting the hydrogen fuel cell with an aqueous acid. In various embodiments, the hydrogen fuel cell can comprise an ionomer comprising a first pKa value, and a water-insoluble net polymer comprising a weakly-acidic functional group ionically associated with a radical scavenger. In various embodiments, the weakly-acidic functional group can comprise a second pKa value greater than the first pKa value, a first activation energy corresponding to an ionic association between the weakly-acidic functional group and the radical scavenger, and a second activation energy corresponding to an ionic association between the weakly-acidic functional group and a contaminant cation. In various embodiments, the aqueous acid can comprise a third pKa value sufficient to overcome the second activation energy and insufficient to overcome the first activation energy. In various embodiments, the method of treating a hydrogen fuel cell further comprises dissociating, by the aqueous acid, contaminant cations from at least one of the ionomer or the water-insoluble net polymer to produce an effluent, and removing the effluent from the hydrogen fuel cell. In various embodiments, in response to the contacting, the radical scavenger remains associated with the weakly-acidic functional group. In various embodiments, the aqueous acid comprises a weak acid.

The foregoing are intended as a simplified introduction to the disclosure, and are not intended to be used to limit the scope of any claim.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

For purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of the disclosure, are to be considered within the scope of the disclosure.

It is to be understood that this disclosure is not limited to the particular configurations, process steps, and materials disclosed herein as such configurations, process steps, and materials may vary. It is also to be understood that the terminology employed herein is used for the purpose of describing particular embodiments only and is not intended to be limiting. In describing the disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "containing," "characterized by," "for example," and grammatical equivalents thereof are inclusive or open-ended terms that do not exclude additional, unrecited elements or method steps.

Via application of principles of the present disclosure, various technical and environmental benefits can be achieved. Exemplary cation-associating fuel cell components can increase the lifespan and/or performance of a fuel cell membrane electrode assembly by mitigating the inhibitory effects of contaminant cations on proton conductivity and oxygen permeability, and/or the effects of radical attack on the proton exchange membrane. Further, exemplary cation-associating fuel cell components can increase the durability of the membrane electrode assembly ionomer and/or other fuel cell components, for example, the bipolar plates and/or other components susceptible to acid corrosion. Additionally, exemplary cation-associating fuel cell components can decrease the acidity of effluent water from the fuel cell.

Definitions and Interpretations

"Membrane electrode assembly," abbreviated as MEA, refers to an assembly of an exchange membrane (e.g., a proton exchange membrane) positioned between a pair of electrodes (e.g., an anode and a cathode) and gas diffusion media.

"Contaminant ion" refers to an ionic chemical species that can interact with components of a membrane electrode assembly in a destructive, inhibitory, or otherwise negative way, reducing desired characteristics of the component.

"Endogenous ion" refers to an ionic chemical species present in the membrane electrode assembly or other components of a fuel cell stack and liberated during operation of the membrane.

"Exogenous ion" refers to an ionic chemical species originating from outside of the membrane electrode assembly, such as, for example, an ionic species introduced to the system via water supplied to the MEA, road salts, and/or other components of a fuel cell stack in which the MEA operates (for example, bipolar plates, steel housing, etc.).

"Weakly-acidic" refers to an acidity that is significantly less than the acidity of a reference species or functional group. For example, a weakly-acidic functional group may have an acid dissociation constant of 10% or less than the acid dissociation constant of a reference species or functional group.

"Cation-associating layer" refers to a portion of an MEA comprising a water-insoluble net polymer configured to preferentially associate with non-protonic cations.

"Preferentially associate" and variations thereof refer to an increased ionic affinity of non-protonic cations for acidic functional groups of a water-insoluble net polymer, as compared to their ionic affinity for the functional groups of the ionomer present in one or more portions of the MEA.

"Radical scavenger" refers to a positively-charged ion or molecule capable of reacting with and/or neutralizing radicals. Radical scavengers, in their oxide forms, can ionize upon exposure to water vapor and/or heat within the PEM or other portions of the MEA.

Figure 1:
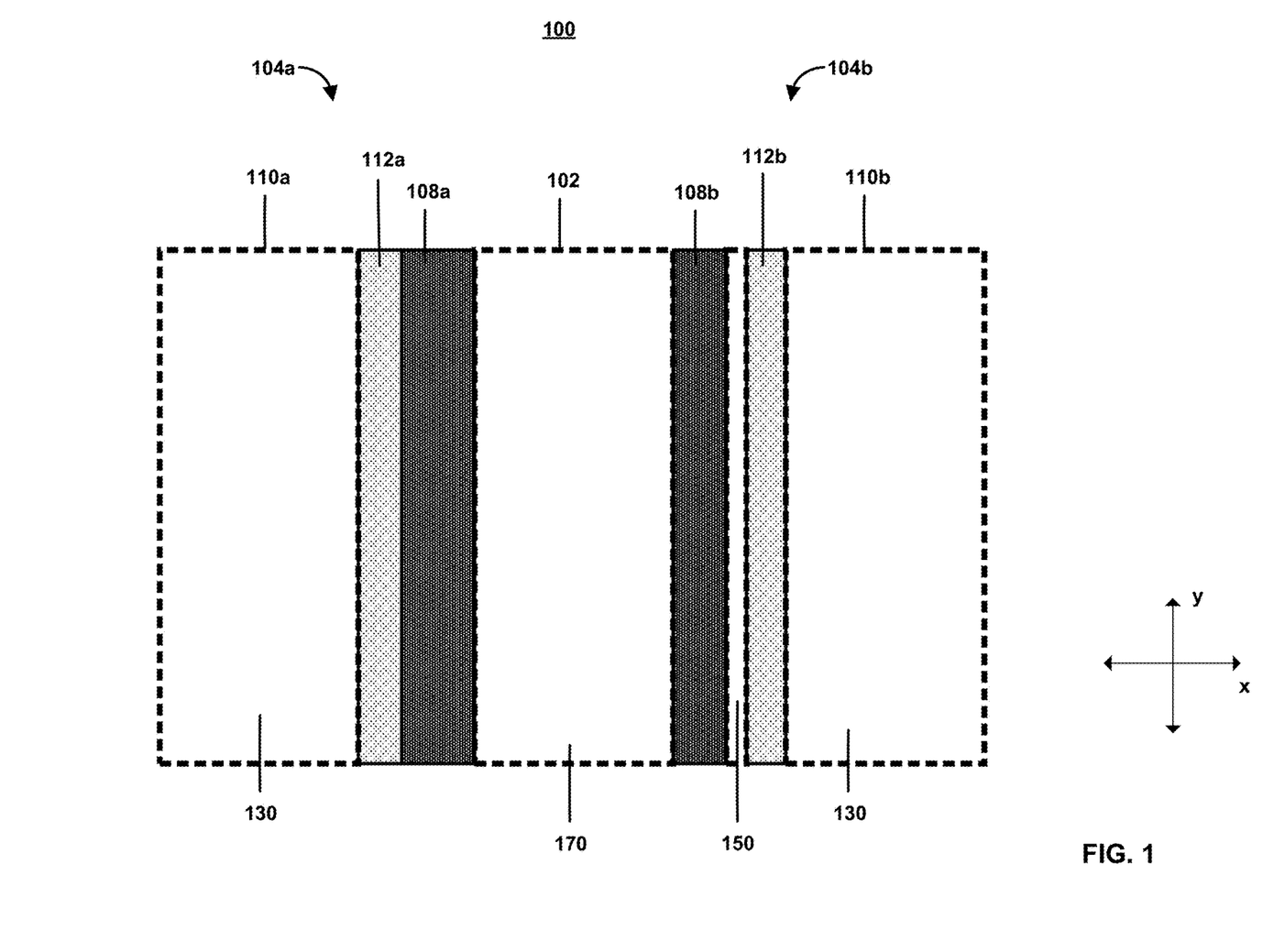
FIG. 1 is a schematic cross-sectional view of an exemplary membrane electrode assembly in accordance with various exemplary embodiments.

"Through-plane" refers to a direction that is substantially perpendicular to the orientation of the layers of the MEA, as illustrated by the x-axis depicted in FIG. 1.

"In-plane" refers to a direction that is substantially parallel to the orientation of layers of the MEA, as illustrated by the y-axis depicted in FIG. 1.

"Gradient" refers to a change in the magnitude of a physical attribute or characteristic of a component of the MEA in a particular dimension such as, for example, the concentration of chemical constituents (such as a weakly-acidic functional group) or the degree of phosphonic substitution.

With reference now to FIG. 1, in various embodiments, a membrane electrode assembly (MEA) 100 is illustrated. MEA 100 comprises a pair of electrodes, 104a and 104b, positioned on either side of and coupled or affixed to a proton exchange membrane 102. In various embodiments, MEA 100 is a membrane electrode assembly configured for use in a fuel cell, such as a proton exchange membrane-based fuel cell.

In various embodiments, electrodes 104a, 104b comprise catalyst layers 108a and 108b. Catalyst layers 108a, 108b catalyze an electrochemical reaction or reactions that convert chemical constituents and generate electrical energy. For example, catalyst layers 108a, 108b can provide catalytic support for electrode reactions which occur in MEA 100.

In various embodiments, electrode 104a is operable as an anode. An anodic reaction can occur within electrode 104a, such as the oxidation of a fuel source. For example, the oxidation reaction can comprise the dissociation of protons and electrons from a diatomic hydrogen molecule, (hydrogen gas, or $H_2$). In such embodiments, anode catalyst layer 108a of electrode 104a facilitates the oxidation of diatomic hydrogen gas by providing catalytic support for the anodic reaction.

Further, in various embodiments electrode 104b is operable as a cathode. A cathodic reaction can occur within electrode 104b, such as the reduction of oxygen. For example, the reduction of oxygen in electrode 104b can comprise the combination of protons, electrons, and diatomic oxygen to form water molecules. In such embodiments, cathode catalyst layer 108b of electrode 104b facilitates formation of water by providing catalytic support for a cathodic reaction.

In various embodiments, cathode catalyst layer 108b comprises electrically active platinum group metals, such as platinum, non-platinum group metal transition-metal-based $N_4$-macrocyclic metal complexes, and/or the like. However, any suitable catalyst particles capable of catalyzing anodic or cathodic reactions within an MEA are within the scope of the present disclosure. During operation of the MEA, metal cations (for example, cobalt and/or iron ions) can dissociate and/or leach from the cathode catalyst layer, the anode catalyst layer, the cathode and/or the anode. Such endogenous cations can cause damage to various portions of the MEA and/or can decrease proton and oxygen conductivity in the MEA.

In various embodiments, MEA 100 further comprises a proton exchange membrane (PEM) 102 disposed between anode catalyst layer 108a and cathode catalyst layer 108b. PEM 102 can comprise one or more proton-conducting ionomers to facilitate transport of protons through catalyst layers 108a, 108b. As used herein, the term "ionomer" may be used to designate a portion of an MEA and/or to refer to an ionized functional group thereof. Other portions of MEA 100 can also comprise one or more proton-conducting ionomers including, without limitation, the catalyst layers 108a, 108b. Suitable proton-conducting ionomers include perfluorosulfonic acid (PFSA), sulfonated tetrafluoroethylene-based fluoropolymers (such as, for example, Nafion®, sold by The Chemours Company, or Aquivion® sold by Solvay S.A.), perfluoro imide acids (PFIA), polyvinylidene fluoride (PVDA), hydrocarbon-based ionomers, partially fluorinated ionomers, and/or the like. Although embodiments of the present disclosure are described with reference to specific ionomers, any ionomer suitable for use within an MEA is within the scope of the present disclosure. Over time and as a result of MEA operation, ionomer-containing membranes can degrade, for example, as a result of radical attack which can occur in the presence of radical-generating contaminant cations (for example, iron ions).

In various embodiments, MEA 100 further comprises an anode-side microporous layer 112a disposed between anode catalyst layer 108a and an anode-side gas diffusion layer 110a. Similarly, MEA 100 can comprises a cathode-side microporous layer 112b disposed between cathode catalyst layer 108b and a cathode-side gas diffusion layer 110b. Contaminant cations can be introduced into the MEA from and/or through gas diffusion layers 110a, 110b. For example, contaminant cations can be exogenous cations introduced through gas diffusion layers 110a, 110b, from various exogenous sources, or endogenous cations.

In various embodiments, MEA 100 can comprise one or more cation-associating layers configured to associate with various cations. As more fully described herein, a cation-associating layer can be configured to preferentially associate with endogenous and/or exogenous contaminant cations such that they are sequestered in desired portions of the MEA, thereby mitigating the inhibitory effect of cations on proton conductivity and oxygen permeability of ionomer in the PEM and at the cathode catalyst layer. As more fully described herein, a cation-associating layer can be configured to preferentially associate with radical scavenger cations such that they are immobilized in desired portions of the MEA, thereby mitigating the damaging effects of radicals. Moreover, it will be appreciated that a particular cation-associating layer may comprise a series, stack, and/or combination of sub-layers, for example two sub-layers, three sub-layers, and/or additional sub-layers.

A cation-associating layer disposed in a first location in MEA 100 may differ in one or more characteristics from another cation-associating layer disposed in a different location in MEA 100, for example in one or more of thickness, composition, gradient, method of forming, method of integration with MEA 100 (and/or components thereof), and/or the like. MEA 100 can have a single cation-associating layer, comprising a contaminant cation-associating layer or a radical scavenger immobilizing layer. MEA 100 can have multiple contaminant cation-associating layers. MEA 100 can have one or more contaminant cation-associating layers and a radical scavenger immobilizing layer. Stated differently, an MEA of the current disclosure may comprise any one or a combination of any of the cation-associating layers described herein.

In various embodiments, a cation-associating layer comprises a water-insoluble net polymer having one or more weakly-acidic functional groups. The net polymer can comprise a fluorocarbon or hydrocarbon polymer. The net polymer can comprise weakly-acidic functional groups bound to a backbone of the net polymer and/or to a side-chain of the net polymer. In various embodiments, the net polymer comprises a weak acid-terminated fluoropolymer. In various embodiments, the net polymer comprises fluoropolymeric phosphonic acid (FPPA). However, it will be understood that the principles of this disclosure encompass any suitable water-insoluble net polymer comprising a weakly-acidic functional group.

In various embodiments, a cation-associating layer comprises a pure water-insoluble net polymer, meaning that the net polymer is not co-polymerized and/or blended with other constituents. In various embodiments, a cation-associating layer comprises a blended cation-associating layer having more than one constituent polymer. Such blended cation-associating layers may comprise a water-insoluble net polymer and one or more of an ionomer, a polymer comprising a different weakly-acidic functional group than the water-insoluble net polymer, and/or a structural support polymer. Such blended cation-associating layers may comprise a homogeneous distribution of water-insoluble net polymer and/or weakly-acidic functional groups. Such blended cation-associating layers may comprise an in-plane gradient distribution of water-insoluble net polymer and/or weakly-acidic functional groups, and/or may comprise a through-plane gradient distribution of water-insoluble net polymer and/or weakly-acidic functional groups, wherein one component decreases in weight percent along an in-plane or through-plane direction whilst another component increases in weight percent in the same in-plane or through-plane direction.

In various embodiments, a cation-associating layer comprises a copolymer polymerized from constituent monomers of the water-insoluble net polymer and constituent monomers of a second polymer. In various embodiments, a cation-associating layer is a terpolymer polymerized from constituent monomers of the water-insoluble net polymer, constituent monomers of a second polymer, and constituent monomers of a third polymer. The second polymer and/or the third polymer can comprise an ionomer, a polymer comprising a different weakly-acidic functional group than the water-insoluble net polymer, and/or a structural support polymer. In various embodiments, a cation-associating layer comprises a block copolymer or block terpolymer. In various embodiments, the copolymer or terpolymer is further blended with one or more other constituents, including as a non-limiting example, an ionomer and/or a structural support polymer. In various embodiments, the net polymer comprises FPPA copolymerized with tetrafluoroethylene (TFE). In various embodiments, the net polymer comprises FPPA copolymerized with PFSA. In various embodiments, the net polymer is a terpolymer comprising FPPA, PFSA, and TFE. In various embodiments, a cation-associating layer comprises a fluorinated vinyl ether. However, a cation-associating layer can comprise any suitable polymer having one or more weakly-acidic functional groups.

Figure 2:
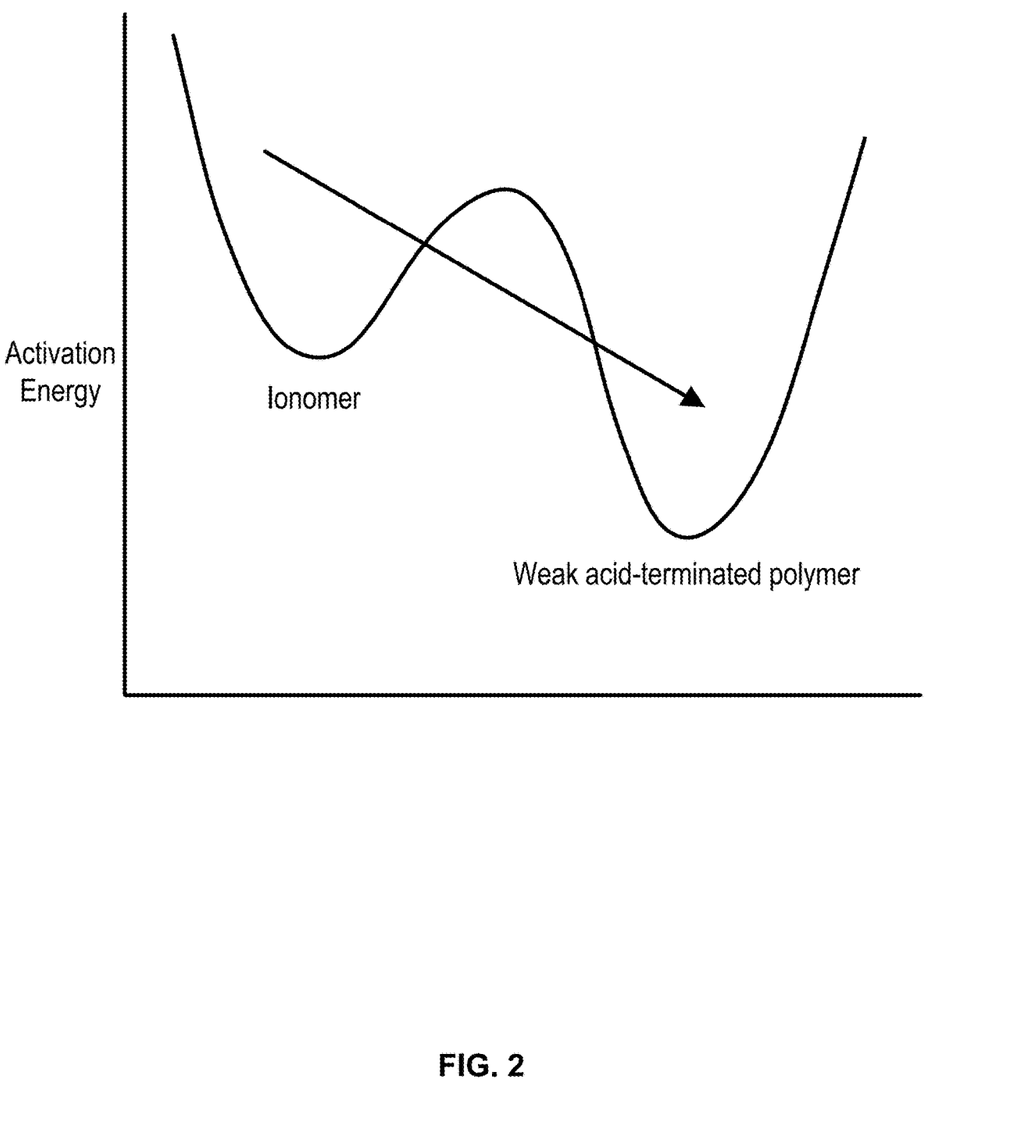
FIG. 2 is a reaction coordinate illustrating the activation energies of radical scavenger association with an exemplary membrane electrode assembly component in accordance with various exemplary embodiments.

In various embodiments, and with reference to FIG. 2, the weakly-acidic functional group comprises any acid with a lower degree of ionic dissociation than the ionomer of the MEA. As a result, non-protonic cation species may be more stable when associated with functional groups of the net polymer than with functional groups of the ionomer. As one non-limiting example, in various embodiments, the non-protonic cation species are more stable when associated with the weakly-acidic functional group than with a sulfonic acid functional group of PFSA. During operation, such non-protonic cations can preferentially associate with the weakly-acidic functional groups of the net polymer, allowing the ionomer to perform its intended function of facilitating proton movement within the MEA. Moreover, because protons will associate more strongly with the ionomer than with the net polymer, embodiments of the present disclosure may not result in lower protonic conductivity even if disposed in various portions of the MEA, either as one or more unitary layers or as a dispersed component.

In various embodiments, the weakly-acidic functional group comprises a higher pKa than the ionomer of the MEA, wherein pKa is the log of the equilibrium constant, Ka, of an acid. The definition of the equilibrium constant can be calculated with Equation 1:

$$Ka = \frac{[H_3O^+][A^-]}{[HA]}.$$
$$pKa = -\log_{10} Ka$$

For example, the pKa of the weakly-acidic functional group (the "second pKa") may be greater than 1.0 higher than the pKa of the ionomer (the "first pKa"). This 1.0 difference corresponds to a 10 times greater dissociation of the ionomer of the MEA as compared to the dissociation of the weakly-acidic functional group. In a further example, the second pKa may be at least 2.0 greater than the first pKa (corresponding to a 100 times greater dissociation of the ionomer) and further still, the second pKa may be at least 3.0 higher than the first pKa (corresponding to a 1000 times greater dissociation of the ionomer).

In various embodiments, the weakly-acidic functional group comprises a phosphonic acid. In various embodiments, the weakly-acidic functional group comprises one or more of a phosphonic acid and carboxylic acid. In various embodiments, the weakly-acid functional group comprises acrylic acid, methacrylic acid, methyl methacrylic acid, or maleic acid. In various embodiments, the weakly-acidic functional group comprises any one of R-Px-Hy, R-Nx-Hy, or R-Ox-Hy. However, the weakly-acidic functional group can comprise any suitable acid functional group having a higher pKa than the ionomer.

Contaminant Cation Sequestration

In various embodiments, a cation-associating layer as described herein can be configured to preferentially associate non-protonic contaminant cations. During operation, the contaminant cation-associating layer may initially be proton exchanged until the introduction of such contaminant cations, which can preferentially associate with the weakly-acidic functional groups of the net polymer. Association of contaminant cations with the net polymer may cause the contaminant cations to become less mobile relative to protons in the MEA. As a result, the contaminant cation-associating layer can act as a sacrificial net for contaminant cations by decreasing mobility of contaminant cations within the MEA and, thereby, mitigating their accumulation at and/or near the cathode catalyst layer and/or the PEM and reducing potential damage to these components.

The contaminant cation-associating layer can be configured to preferentially associate exogenous cations, such as cations present in water introduced into the fuel cell stack, and consequentially, the MEAs of the fuel cells stack. The contaminant cation-associating layer can be configured to preferentially associate with endogenous cations, such as those cations which can be generated from one or more portions of the MEA or other components of a fuel cell stack. Stated differently, a cation-associating layer can comprise one or more exogenous cation-associating layers and/or one or more endogenous cation-associating layers.

With reference again to FIG. 1, a cation-associating layer can comprise exogenous cation-associating layer 130. In various embodiments, exogenous cation-associating layer 130 is disposed in at least a portion of anode-side gas diffusion layer 110a and/or at least a portion of cathode-side gas diffusion layer 110b. In various embodiments, exogenous cation-associating layer 130 is disposed in at least a portion of anode-side microporous layer 112a and/or at least a portion of cathode-side microporous layer 112b. Exogenous cation-associating layer 130 can be dispersed evenly throughout one or more of the gas diffusion layers, 110a, 110b, and/or the microporous layers, 112a, 112b. Moreover, exogenous cation-associating layer 130 can be dispersed in only a portion of one or more of the gas diffusion layers, 110a, 110b, and/or the microporous layers, 112a, 112b, whether evenly or as an in-plane and/or through-plane gradient. Although an exogenous cation-associating layer is described herein, it will be appreciated that exogenous cation-associating layer 130 is capable of preferentially associating with both exogenous and endogenous contaminant cations.

With reference again to FIG. 1, a cation-associating layer can comprise endogenous cation-associating layer 150. In various embodiments, endogenous cation-associating layer 150 is disposed between cathode catalyst layer 108b and cathode-side microporous layer 112b. In various embodiments, endogenous cation-associating layer 150 is disposed in at least a portion of cathode catalyst layer 108b. In various embodiments, endogenous cation-associating layer 150 is disposed in a portion of the cathode catalyst layer 108b closest to cathode-side microporous layer 112b. In various embodiments, endogenous cation-associating layer 150 is disposed in at least a portion of cathode-side microporous layer 112b. In various embodiments, endogenous cation-associating layer 150 is disposed in a portion of the cathode-side microporous layer 112b closest to cathode catalyst layer 108b. Although an endogenous cation-associating layer is described herein, it will be appreciated that endogenous cation-associating layer 150 is capable of preferentially associating with both endogenous and exogenous cations.

Figure 3A:
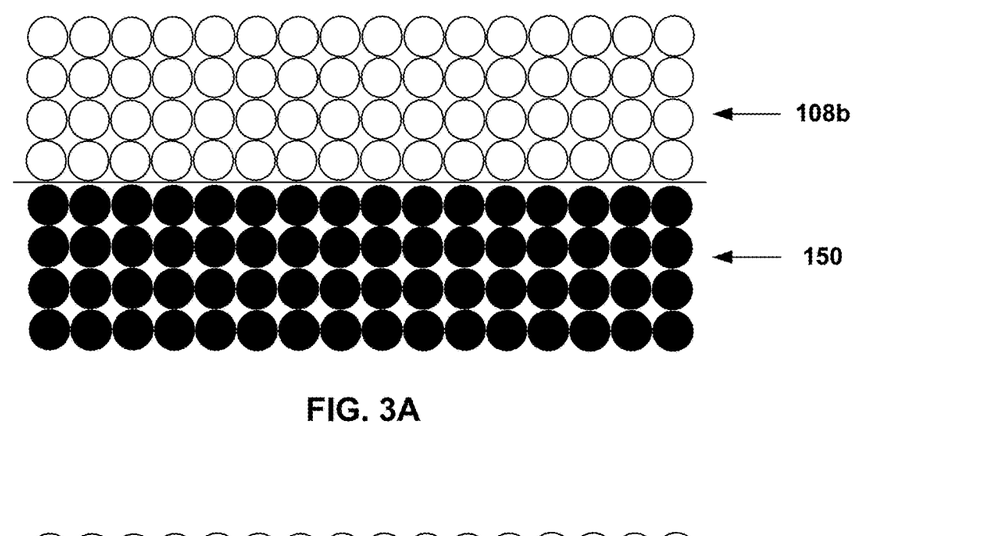
FIGS. 3a-3c are cross-sectional views of exemplary membrane electrode assembly layers in accordance with various embodiments.
Figure 3B:
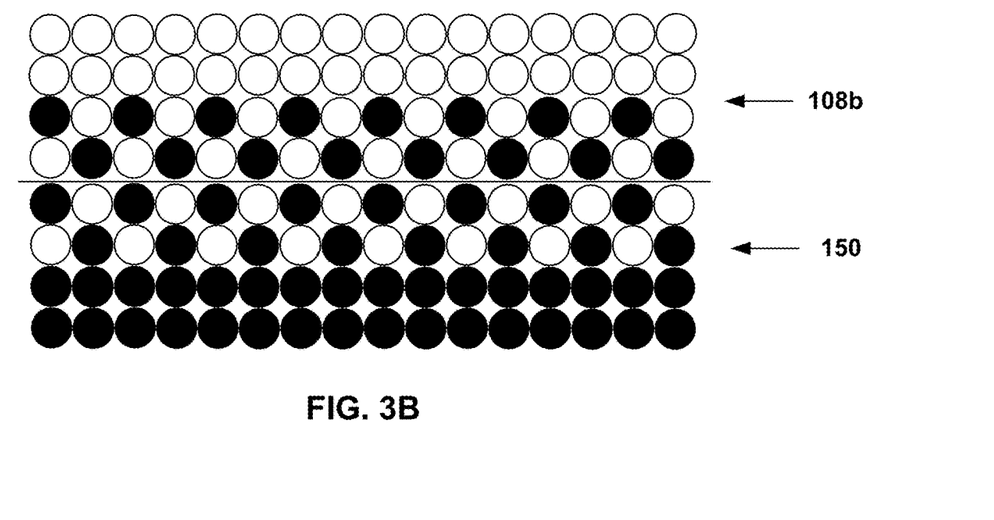
Figure 3C:
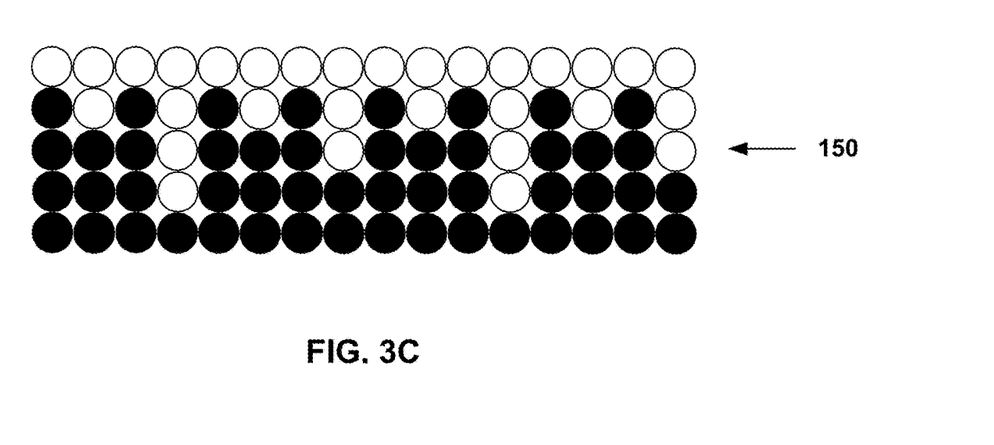
Figure 4:
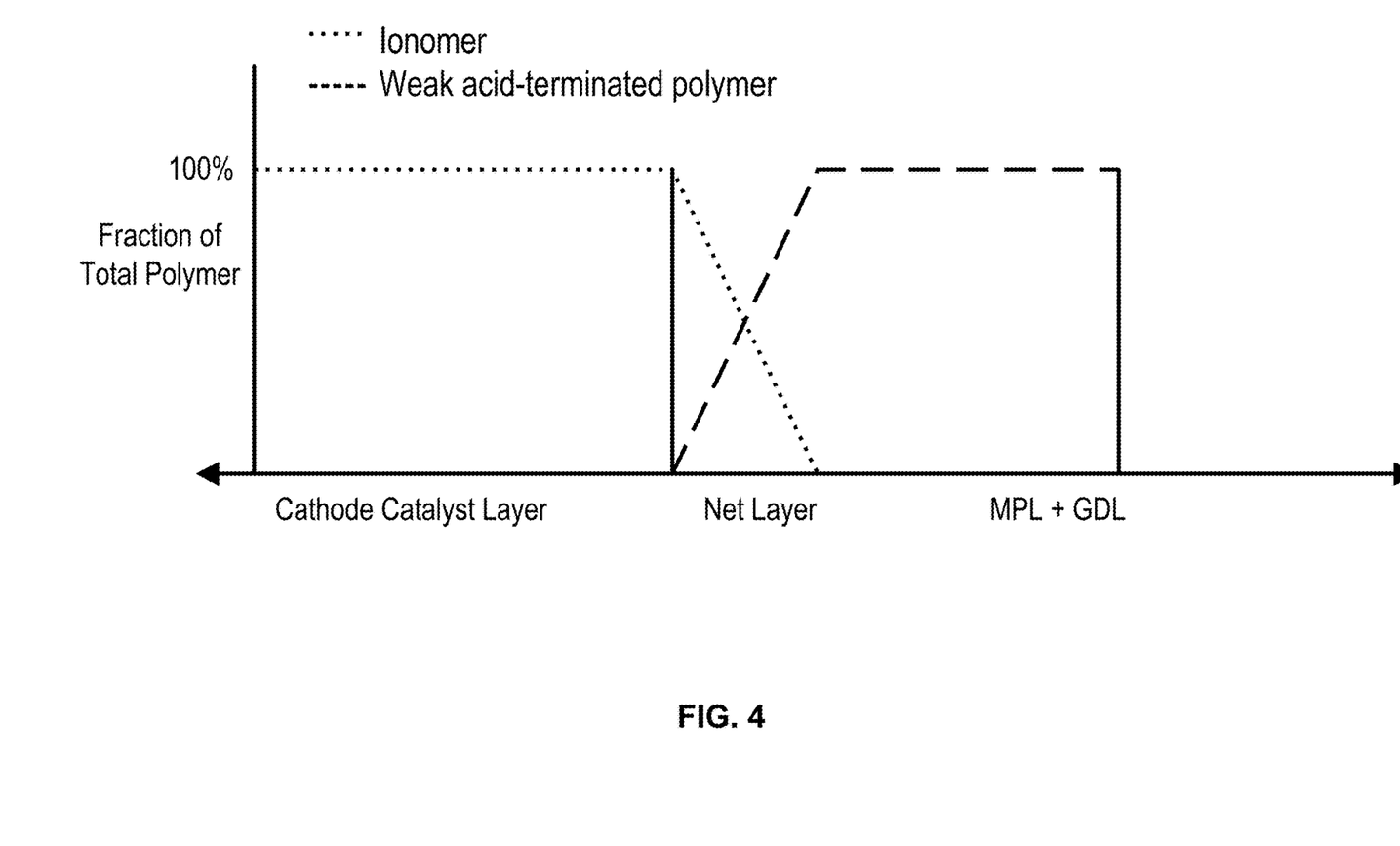
FIG. 4 illustrates the relative distribution of an exemplary ionomer and an exemplary net polymer in portions of an exemplary membrane electrode assembly component in accordance with various exemplary embodiments.

With reference now to FIG. 3A, endogenous cation-associating layer 150 can be disposed as a separate membrane layer within the MEA distinct from cathode catalyst layer 108b and/or cathode-side microporous layer 112b. With reference to FIG. 3B, endogenous cation-associating layer 150 can be blended at, and/or near, the adjoining edges of endogenous cation-associating layer 150 and cathode catalyst layer 108b, such that some ionomer constituents are present in the endogenous cation-associating layer 150, and some weak-acid terminated net polymer constituents are present in the cathode catalyst layer 108b. Such blended portions of endogenous cation-associating layer 150 and cathode catalyst layer 108b can comprise an even distribution of weakly-acidic functional groups and/or a gradient distribution of weakly-acidic functional groups. With reference now to FIG. 3C and FIG. 4, endogenous cation-associating layer 150 can comprise both ionomer and net polymer constituents configured in a gradient distribution. Gradient distributions as described herein can comprise in-plane gradients and/or through-plane gradients. In various embodiments, a gradient comprises an increasing concentration of weakly-acidic functional groups biased in the direction of cathode-side microporous layer 112b.

Without wishing to be bound by theory, utilizing a gradually increasing concentration of weakly-acidic functional groups at, and/or near the cathode catalyst layer 108b can decrease and/or minimize competition for protons between the cation-associating net polymer and catalytic sites on the cathode catalyst layer 108b. Although not depicted herein, it should be understood that the descriptions of even dispersion and gradient dispersion between endogenous cation-associating layer 150 and cathode catalyst layer 108b are equally applicable to the relative dispersion of endogenous cation-associating layer 150 and cathode-side microporous layer 112b.

In various embodiments, endogenous cation-associating layer 150 comprises an in-plane thickness of about 10 nm to about 5 μm (wherein "about" means+/−5 nm). In various embodiments, endogenous cation-associating layer 150 comprises an in-plane thickness of about 100 nm to about 2 μm. In various embodiments, endogenous cation-associating layer 150 comprises an in-plane thickness of about 500 nm to about 1 μm. The in-plane thickness of endogenous cation-associating layer 150 can vary based on a planned duration between implementations of maintenance protocols. For example, an in-plane thickness of endogenous cation-associating layer 150 may have an inversely proportional relationship to the planned frequency of rejuvenation treatments (as described more fully herein) applied to an MEA. However, exemplary MEAS of the present disclosure can comprise any suitable thickness of endogenous cation-associating layer 150.

Radical Scavenger Immobilization

In various embodiments, a cation-associating layer as described herein comprises a radical scavenger-immobilizing layer. The radical scavenger-immobilizing layer can comprise weakly-acidic functional groups configured to preferentially associate radical scavenger cations and retain them in desired positions, thereby preventing and/or minimizing their migration in-plane and/or through-plane within the PEM. As a result, the radical scavenger-immobilizing layer can decrease and/or minimize radical scavenger cation concentration at the cathode catalyst layer; the radical scavenger-immobilizing layer can thus maintain and/or improve the durability of radical scavenger cation distribution within the PEM, whether in-plane or through-plane.

With reference again to FIG. 1, a cation-associating layer can comprise a radical scavenger-immobilizing layer 170. In various embodiments, radical scavenger-immobilizing layer 170 is disposed in at least a portion of PEM 102. Radical scavenger-immobilizing layer 170 can comprise at least one ionomer and a water-insoluble net polymer as described herein. Stated differently, at least a portion of PEM 102 can further comprise a water-insoluble net polymer so as to substantially immobilize cationic radical scavengers within the PEM, via preferential association with weakly-acidic functional groups of the net polymer, without substantially impeding the movement of protons through PEM 102 towards cathode catalyst layer 108b.

In various embodiments, radical scavenger-immobilizing layer 170 is dispersed evenly throughout PEM 102. In various embodiments, radical scavenger-immobilizing layer 170 is disposed in a gradient distribution through at least a portion of PEM 102. The gradient distribution can comprise an in-plane gradient and/or a through-plane gradient. Without wishing to be bound by theory, portions of the PEM can be more susceptible to radical attack and/or can be subject to more frequent radical attack. In such susceptible portions of the MEA, a radical scavenger-immobilizing layer 170 can comprise a greater concentration of weakly-acidic functional groups than a radical scavenger-immobilizing layer disposed in other portions of the MEA that are less susceptible and/or less subject to radical attack.

In various embodiments, the ratio of water-insoluble net polymer to ionomer in PEM 102 is optimized so as to prevent and/or decrease proton transport mitigation by radical scavenger-immobilizing layer 170. The ratio of weakly-acidic functional groups to other proton-conducting functional groups present in PEM 102 may be similarly optimized. The percentage of weakly-acidic functional groups (abbreviated here as "FG") present in PEM 102 can be calculated with Equation 2:

$$\% \text{ Weakly Acidic } FG = \frac{\text{Mols of Weakly Acidic } FG}{(\text{Mols of Weakly Acidic } FG + \text{Mols of Ionomer } FG)}$$

In various embodiments, PEM 102 comprises about 0.5% to about 20% (wherein "about" means+/−0.25%) weakly-acidic functional groups. In various embodiments, PEM 102 comprises about 0.75% to about 10% (wherein "about" means+/−0.5%) weakly-acidic functional groups. In various embodiments, PEM 102 comprises about 1% to about 5% (wherein "about" means+/−0.5%) weakly-acidic functional groups. However, any suitable composition of PEM 102 capable of both immobilizing radical scavengers and permitting proton transport is within the scope of this disclosure.

In various embodiments, radical scavenger-immobilizing layer 170 can be treated (e.g., pre-treated or prepared for use within the MEA) with one or more radical scavengers. The radical scavengers can comprise an ionic form and/or an oxide form. In various embodiments, the radical scavengers comprise more than one oxidation state. In various embodiments, the radical scavengers are regenerative, such that the reaction between a radical and a radical scavenger having a first oxidation state generates a radical scavenger having a second oxidation state; and the reaction between a radical and the radical scavenger having the second oxidation state generates a radical scavenger having the first oxidation state.

In various embodiments, the radical scavenger comprises one or more of a lanthanide metal and a transition metal. In various embodiments, the radical scavenger comprises cerium. In various embodiments, the radical scavenger comprises manganese. In various embodiments, the radical scavenger comprises an organic compound. However, any radical scavenger capable of preferentially binding to a weakly-acidic functional group and suitable for use in the MEA is within the scope of this disclosure.

In various embodiments, radical scavenger-immobilizing layer 170 is treated with radical scavengers in one or more of an ionic form, an oxide form, and a doped oxide nanoparticle form. Such combined treatment of radical scavenger-immobilizing layer 170 can provide a benefit if, under certain operating conditions, radical scavengers begin to ionize and/or migrate. Such combined treatment of radical scavenger-immobilizing layer 170 can provide a benefit if, after extended operation, one mode of radical scavenger availability begins to diminish and/or fail.

In various embodiments, a radical scavenger used to treat a radical scavenger-immobilizing layer 170 comprises at least one of an ionic form or an oxide form. In various embodiments, a radical scavenger-immobilizing layer 170 may be additionally treated with a doped oxide nanoparticle radical scavenger. The radical scavenger can comprise cerium and/or manganese. However, the radical scavenger can comprise any suitable lanthanide metal, transition metal, and/or particle suitable for regenerative radical scavenging. The radical scavenger-immobilizing layer 170 can be treated with cerium in at least one of an ionic form or an oxide form (i.e., in the form of cerium ions, or cerium oxide ($CeO_2$)), and additionally treated with doped cerium oxide nanoparticles.

In various embodiments, radical scavenger-immobilizing layer 170 is partially treated with at least one of an ionic form or an oxide form of a metal, and additionally treated with a doped metal oxide nanoparticle. In such embodiments, the phrase "partially treated" should be understood to refer to treatment of radical scavenger-immobilizing layer 170 with an amount of radical scavenger insufficient to associate with all of the weakly-acidic functional groups present in radical scavenger-immobilizing layer 170. In such embodiments, unassociated weakly-acidic functional groups can be configured to associate with radical scavenger cations as they dissolve from an oxide form and/or a doped oxide nanoparticle form. In various embodiments, radical scavenger-immobilizing layer 170 is treated only with doped oxide nanoparticles. In such embodiments, weakly-acidic functional groups of radical scavenger-immobilizing layer 170 can be configured to associate with radical scavenger cations as they dissolve from a doped oxide nanoparticle form.

Cation Net Rejuvenation Treatment

Application of the principles already disclosed herein can result in sequestration of contaminant cations and immobilization of radical scavengers by weakly-acidic functional groups of the net polymer. However, during operation of the MEA, contaminant cations are continuously generated and/or introduced, potentially leading to exhaustion of available non-protonic cation-associating functional groups. Accordingly, in various embodiments, an MEA as described herein may be treated so as to rejuvenate the net polymer by dissociating certain contaminant cations from the weakly-acidic functional groups thereof and/or removing such contaminant cations from the MEA. As a result of this rejuvenation treatment, the weakly-acidic functional groups of the net polymer will again be available to preferentially associate with non-protonic contaminant cations, thereby potentially increasing the durability, lifetime, and/or performance of the MEA and/or a fuel cell in which it operates.

In various embodiments, a one-step rejuvenation treatment comprises contacting an MEA with an aqueous acid. In various embodiments, the MEA is configured in accordance with the present disclosure as described herein. In some embodiments, the aqueous acid can be insufficiently acidic to dissociate the radical scavenger from the weakly-acidic functional group to which it is ionically bound, yet sufficiently acidic to dissociate certain contaminant cations from the weakly-acidic functional group to which they are ionically bound. Stated differently, and with reference to FIG. 5, in various embodiments, a pKa value of the aqueous acid used for rejuvenation is insufficient to overcome a first activation energy 502 required to disrupt the ionic association between the radical scavenger and the weakly-acidic functional group, but is sufficient to overcome a second, lesser activation energy 504 required to disrupt the ionic association between certain contaminant cations and the weakly-acidic functional group. The aqueous acid can comprise any acid having a pKa falling within range 510.

Figure 5:
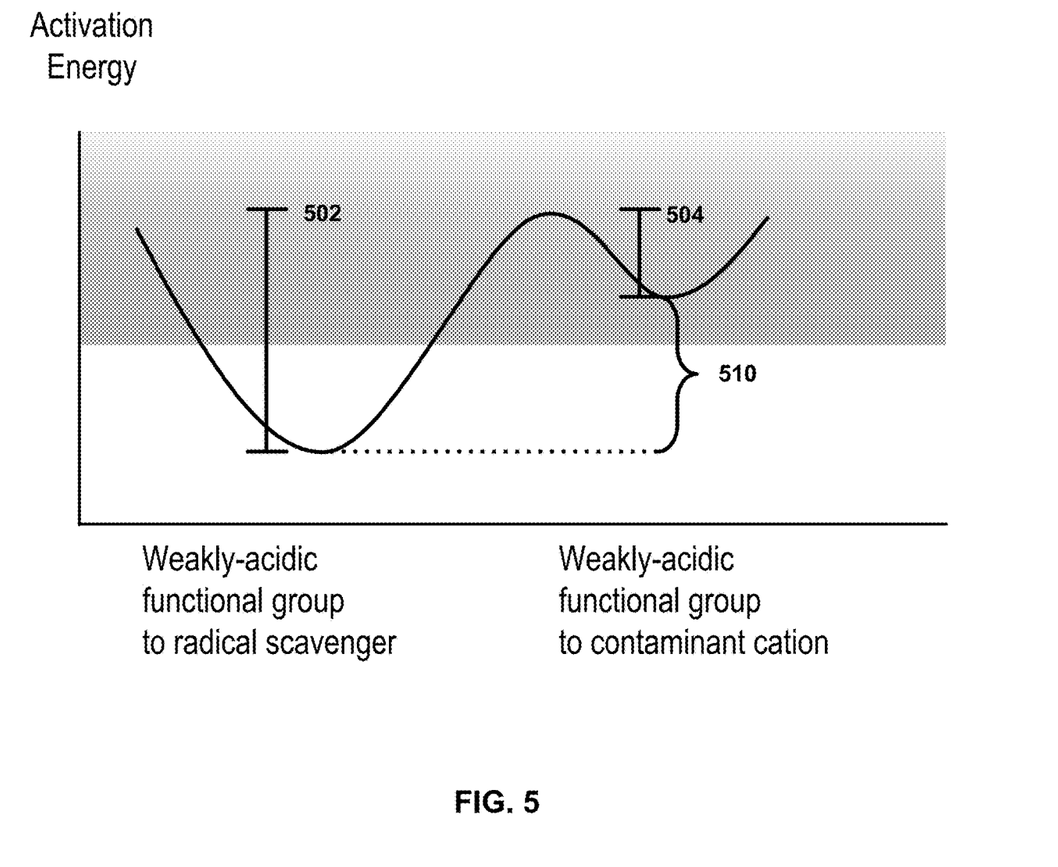
FIG. 5 is a reaction coordinate illustrating the activation energies of radical scavenger association with an exemplary membrane electrode assembly component in accordance with various exemplary embodiments.

In various embodiments, the aqueous acid comprises a concentration insufficient to dissociate the radical scavenger from the weakly-acidic functional group to which it is ionically bound, but sufficient to dissociate certain contaminant cations from the weakly-acidic functional group to which they are ionically bound. Stated differently, the concentration of the aqueous acid may be insufficient to overcome a first activation energy 502 required to disrupt the ionic association between the radical scavenger and the weakly-acidic functional group, but sufficient to overcome a second activation energy 504 required to disrupt the ionic association between certain contaminant cations and the weakly-acidic functional group. The aqueous acid can comprise any acid having a concentration falling within range 510.

In various embodiments, the contaminant cation dissociated from the weakly-acidic functional group during a rejuvenation treatment as described herein comprises, for example, any one or more of iron, cobalt, iridium, potassium, sodium, or calcium cations. In various embodiments, the contaminant cation comprises a cation having a smaller molecular weight than the radical scavenger. In various embodiments, the contaminant cation comprises a charge and/or molecular weight such that the activation energy required for its dissociation from the weakly-acidic functional group is smaller than the activation energy required to dissociate the radical scavenger from the weakly-acidic functional group.

Contacting the MEA with the aqueous acid can cause the weakly-acidic functional group to maintain the radical scavenger in an immobilized state, while dissociating certain contaminant cations, for example, iron. As a result of dissociation, contaminant cations in the acid wash can enter an aqueous effluent. Removal of the aqueous effluent from the MEA can remove the contaminant cations from the MEA and can make weakly-acidic functional groups available for association with newly introduced contaminant cations, thereby rejuvenating the MEA without disrupting the immobilized radical scavengers.

In various embodiments, the aqueous acid comprises a weak acid. In various embodiments, the weak acid comprises one or more of sulfuric acid or perchloric acid. However, the weak acid may comprise any aqueous acid configured to dissociate contaminant cations from the weakly-acidic functional group without substantially disrupting the association between the weakly-acidic functional group and the radical scavenger. In various embodiments, the radical scavenger comprises cerium, and the contaminant cation comprises iron. However, any suitable aqueous acid, radical scavenger, and contaminant cation having the characteristics described herein are within the scope of this disclosure.

In various embodiments, a two-step rejuvenation treatment comprises contacting an MEA with an aqueous acid. The aqueous acid can be sufficiently acidic to dissociate the radical scavenger from portions of the MEA (for example, an ionomer and/or a weakly-acidic functional group to which it is ionically bound), and also sufficiently acidic to dissociate some or all contaminant cations from portions of the MEA. Stated differently, in various embodiments, a pKa value of the aqueous acid is sufficient to overcome the activation energy required to disrupt the ionic association between portions of the MEA, the radical scavengers, and contaminant cations.

In the two-step rejuvenation treatment, contacting the MEA with the aqueous acid can cause both contaminant cations and radical scavengers to enter the aqueous effluent. Thereafter, the two-step rejuvenation treatment can comprise removing the aqueous effluent from the MEA, contacting the MEA with replacement radical scavengers, and re-associating the radical scavengers from portions of the MEA.

Figure 6:
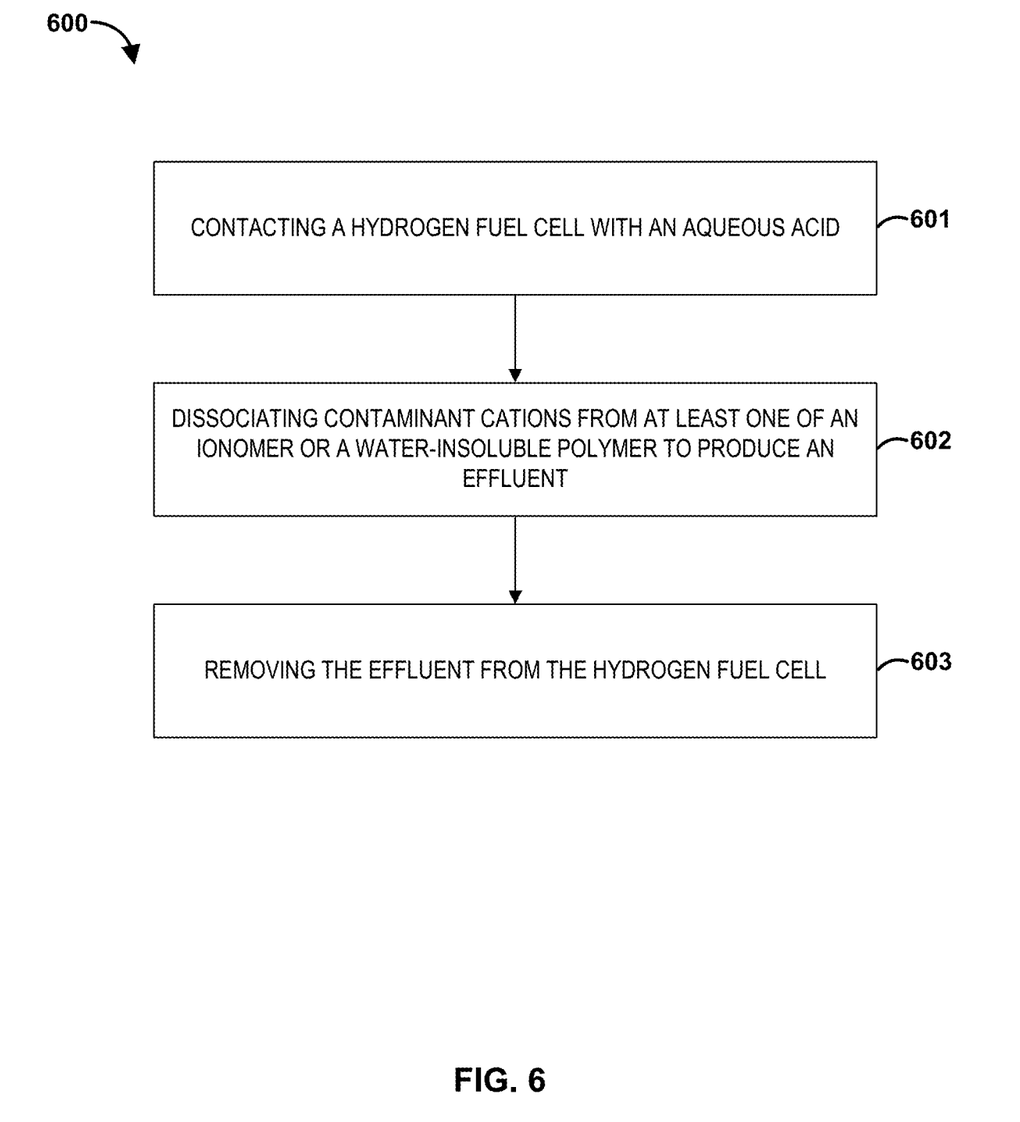
FIG. 6 is a flow chart illustrating an exemplary method in accordance with various exemplary embodiments.

With reference now to FIG. 6, a method 600 of treating a hydrogen fuel cell is provided. Method 600 comprises contacting a hydrogen fuel cell with an aqueous acid (Step 601), wherein the fuel cell comprises an ionomer comprising a first pKa value and a water-insoluble net polymer comprising a weakly-acidic functional group ionically associated with at least one of a lanthanide metal and a transition metal. In various embodiments, the weakly-acidic functional group comprises a second pKa value greater than the first pKa value, a first activation energy corresponding to an ionic association between the weakly-acidic functional group and the at least one of a lanthanide metal and a transition metal, and a second activation energy corresponding to an ionic association between the weakly-acidic functional group and a contaminant cation. In various embodiments, the aqueous acid comprises a third pKa value sufficient to overcome the second activation energy and insufficient to overcome the first activation energy.

In various embodiments, method 600 further comprises dissociating, by the aqueous acid, contaminant cations from at least one of the ionomer or the water-insoluble net polymer to produce an effluent (Step 602). In various embodiments, method 600 comprises removing the effluent from the hydrogen fuel cell (Step 603). In various embodiments, in response to the contacting, the at least one of a lanthanide metal or a transition metal remains associated with the weakly-acidic functional group.

Various methods of making a cation-associating layer, as described herein, are provided. A method of making a cation-associating layer can comprise synthesizing a perfluorinated monomer comprising a weakly-acidic functional group. The net polymer can comprise a pure cation-associating layer. The method can further comprise disposing the pure cation-associating layer in a proton exchange membrane. In various embodiments, the method further comprises contacting the cation-associating layer with a radical scavenger.

Figure 7:
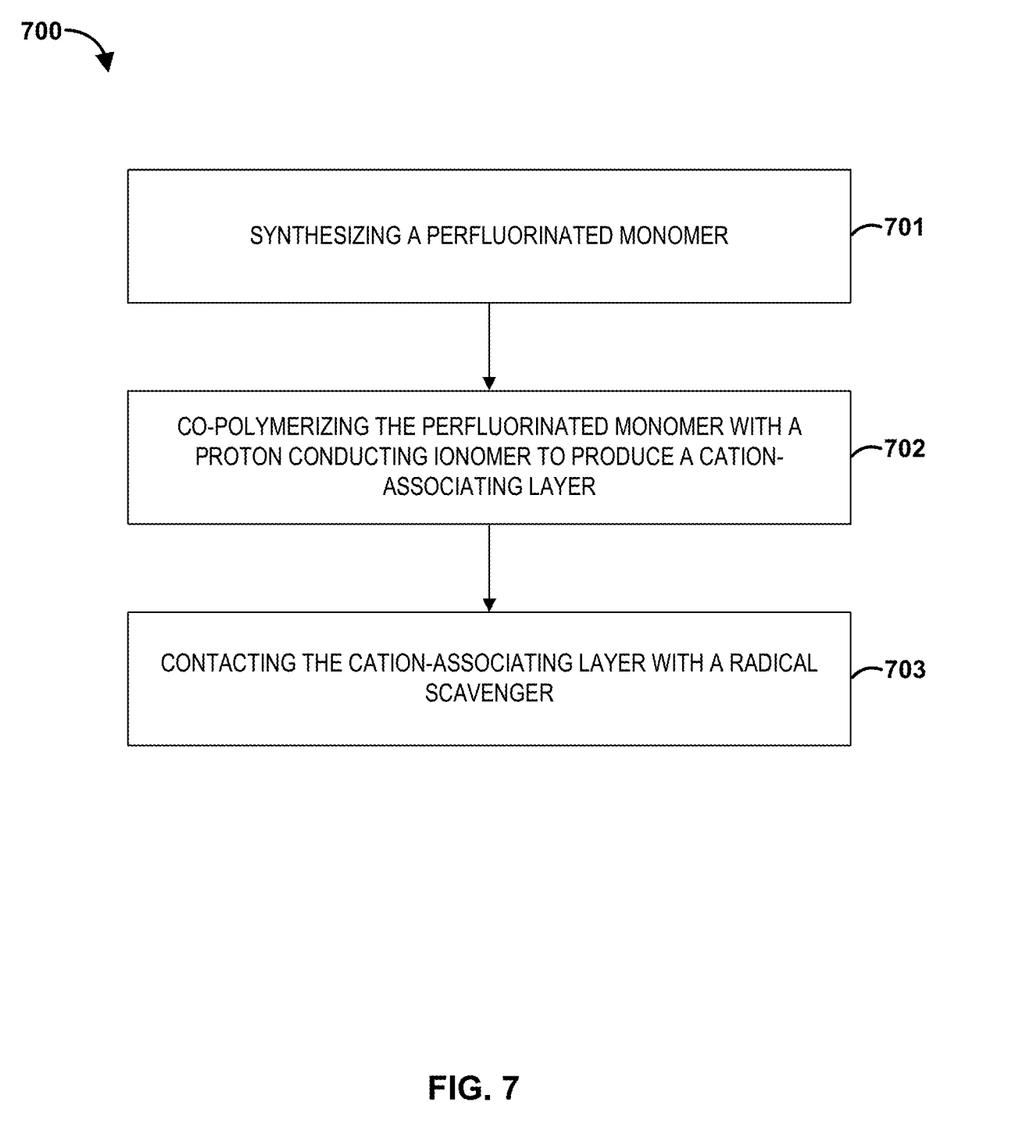
FIG. 7 is a flow chart illustrating an exemplary method in accordance with various exemplary embodiments.

With reference now to FIG. 7, a method 700 of making a proton exchange membrane is provided. Method 700 can comprise synthesizing a perfluorinated monomer comprising a weakly-acidic functional group (Step 701). Method 700 can further comprise co-polymerizing the perfluorinated monomer with a proton conducting ionomer to produce a cation-associating layer (Step 702). In various embodiments, method 700 further comprises contacting the cation-associating layer with a radical scavenger (Step 703). In various embodiments, the radical scavenger comprises at least one of a lanthanide metal or a transition metal. In various embodiments, the at least one of a lanthanide metal or a transition metal comprises at least one of cerium or manganese. In various embodiments, the perfluorinated monomer comprises perfluorinated phosphonic acid and the proton conducting ionomer comprises at least one of tetrafluoroethylene or perfluorosulfonic acid.

Figure 8:
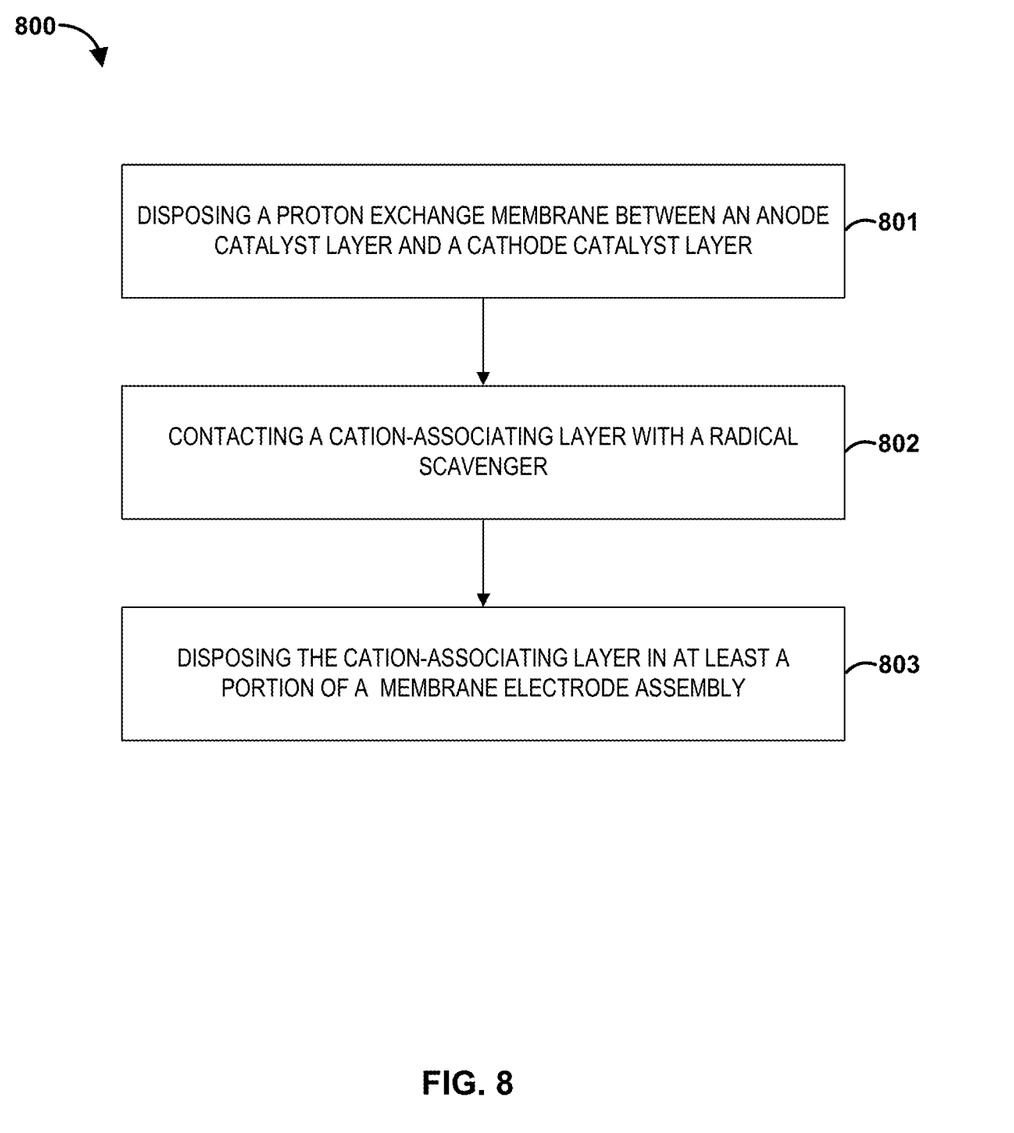
FIG. 8 is a flow chart illustrating an exemplary method in accordance with various exemplary embodiments.

With reference now to FIG. 8, a method 800 of making a membrane electrode assembly is provided. Method 800 can comprise disposing a proton exchange membrane between an anode catalyst layer and a cathode catalyst layer (Step 801) and contacting a cation-associating layer with a radical scavenger (Step 802). In various embodiments, the cation-associating layer comprises a weak acid-terminated fluoropolymer. In various embodiments, method 800 can further comprise disposing the cation-associating layer in at least a portion of the membrane electrode assembly (Step 803). In various embodiments, the cation-associating layer is disposed in at least one of a proton exchange membrane, a cathode catalyst layer, a cathode-side microporous layer, an anode-side gas diffusion layer, a cathode-side gas diffusion layer, and/or between the cathode catalyst layer and the cathode microporous layer.

In this disclosure, reference has been made to the accompanying drawings, which form a part hereof, and in which is shown by way of illustration specific embodiments in which the disclosure may be practiced. It is understood that other embodiments may be utilized, and structural changes may be made, without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate embodiments may be used in any combination desired to form additional hybrid embodiments of the disclosure.

Further, although specific embodiments of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents. Also, as used herein, the terms "coupled," "coupling," or any other variation thereof, are intended to cover a physical connection, an electrical connection, a magnetic connection, an optical connection, a communicative connection, a functional connection, a thermal connection, a chemical connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A membrane electrode assembly comprising:
    a proton exchange membrane comprising an ionomer having a first pKa value; and
    a cation-associating layer comprising the ionomer and a water-insoluble net polymer comprising a weakly-acidic functional group having a second pKa value,
        wherein the second pKa value is at least 1.0 greater than the first pKa value of the ionomer, and
        wherein the cation-associating layer is disposed between a cathode catalyst layer of the membrane electrode assembly and a cathode microporous layer of the membrane electrode assembly.

2. The membrane electrode assembly of claim 1, wherein the cation-associating layer is disposed in at least a portion of the cathode microporous layer.

3. The membrane electrode assembly of claim 1, comprising:
    a first cation-associating layer comprising the ionomer and a first portion of the water-insoluble net polymer; and
    at least one second cation-associating layer comprising a second portion of the water-insoluble net polymer,
    wherein the first cation-associating layer is configured to immobilize radical scavengers, and the at least one second cation-associating layer is configured to sequester contaminant cations.

4. A membrane electrode assembly comprising:
    a proton exchange membrane disposed between an anode catalyst layer and a cathode catalyst layer; and
    a cation-associating layer comprising a water-insoluble net polymer,
    wherein the water-insoluble net polymer comprises a weakly-acidic functional group, and
    wherein the weakly-acidic functional group is configured to preferentially associate with contaminant cations, and
    wherein the cation-associating layer is disposed in at least a portion of the cathode catalyst layer.

5. The membrane electrode assembly of claim 4, wherein the cation-associating layer is disposed between the cathode catalyst layer and a microporous layer of the membrane electrode assembly.

6. The membrane electrode assembly of claim 5, wherein the cation-associating layer is disposed in at least a portion of a microporous layer of the membrane electrode assembly.

7. The membrane electrode assembly of claim 4, wherein the cation-associating layer is disposed in at least one of an anode-side gas diffusion layer of the membrane electrode assembly or a cathode-side gas diffusion layer of the membrane electrode assembly.

8. A membrane electrode assembly, comprising:
    a proton exchange membrane comprising an ionomer and disposed between an anode catalyst layer and a cathode catalyst layer; and
    a cation-associating layer comprising a water-insoluble net polymer and disposed between the cathode catalyst layer and a cathode-side microporous layer,
    wherein the water-insoluble net polymer comprises a weakly-acidic functional group,
    wherein the ionomer comprises a first pKa and the weakly-acidic functional group comprises a second pKa at least 3.0 greater than the first pKa, and wherein a concentration of water-insoluble net polymer increases across the cation-associating layer in a through-plane direction from a first, lower concentration at an interface between the cathode catalyst layer and the cation-associating layer to a second, higher concentration at an interface between the cation-associating layer and the cathode-side microporous layer.

\* \* \* \* \*